US009293150B2

(12) United States Patent
Boegelund et al.

(10) Patent No.: US 9,293,150 B2
(45) Date of Patent: Mar. 22, 2016

(54) SMOOTHENING THE INFORMATION DENSITY OF SPOKEN WORDS IN AN AUDIO SIGNAL

(71) Applicant: International Business Machines Corporation, Armonk, NY (US)

(72) Inventors: Flemming Boegelund, Frederikssund (DK); Lav R. Varshney, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/025,323

(22) Filed: Sep. 12, 2013

(65) Prior Publication Data

US 2015/0073803 A1 Mar. 12, 2015

(51) Int. Cl.
*G10L 21/057* (2013.01)
*G10L 25/60* (2013.01)
*G10L 15/02* (2006.01)

(52) U.S. Cl.
CPC ............... *G10L 21/057* (2013.01); *G10L 25/60* (2013.01); *G10L 2015/025* (2013.01)

(58) Field of Classification Search
CPC ..................................................... G10L 21/057
USPC ......................................................... 704/254
See application file for complete search history.

(56) References Cited

U.S. PATENT DOCUMENTS 5,828,994 A 10/1998 Covell
6,535,853 B1 3/2003 Reitano
7,412,379 B2 8/2008 Taori
7,742,921 B1 6/2010 Davis et al.
7,844,464 B2 11/2010 Schubert
7,962,341 B2 * 6/2011 Braunschweiler ............ 704/258
8,219,398 B2 7/2012 Marple et al.
2002/0086269 A1 7/2002 Shpiro
2008/0162151 A1 7/2008 Cho
2012/0116767 A1 5/2012 Hasdell et al.
2012/0141031 A1 6/2012 Boegelund et al.

OTHER PUBLICATIONS

Arbesman, S. et al, "The Structure of Phonological Networks Across Multiple Languages," Int. J. Bifurcation and Chaos, vol. 20, No. 3, pp. 679-685, 2010, http://dx.doi.org/10.1142/S021812741002596X.
Arbesman, S. et al, "Comparative Analysis of Networks of Phonologically Similar Words in English and Spanish," Entropy, vol. 12, pp. 327-337, 2010, http://dx.doi.org/10.3390/e12030327.

(Continued)

*Primary Examiner* — Susan McFadden
(74) *Attorney, Agent, or Firm* — Penny L. Lowry; Jeanine Ray

(57) ABSTRACT

A portion of an audio signal is identified corresponding to a spoken word and its phonemes. A set of alternate spoken words satisfying phonetic similarity criteria to the spoken word is generated. A subset of the set of alternate spoken words is also identified; each member of the subset shares the same phoneme in a similar temporal position as the spoken word. A significance factor is then calculated for the phoneme based on the number of alternates in the subset and on the total number of alternates. The calculated significance factor may then be used to lengthen or shorten the temporal duration of the phoneme in the audio signal according to its significance in the spoken word.

20 Claims, 5 Drawing Sheets

(56) References Cited

OTHER PUBLICATIONS

Bent, T. et al, "Non-native speech production II: Phonemic errors by position-in-word and intelligibility," J. Acoustical Society of America, vol. 110, No. 5, pp. 2684-2684, 2001, http://asadl.org/jasa/resource/1/jasman/v110/i5/p2684_s3.
Chan, K. Y. et al, "The Influence of the Phonological Neighborhood Clustering-Coefficient on Spoken Word Recognition," J. Exp. Psychol. Hum. Percept. Perform., vol. 35, No. 6, pp. 1934-1949, Dec. 2009. http://dx.doi.org/10.1037/a0016902.
Chan, K. Y. et al, "Network Structure Influences Speech Production," Cognitive Science, vol. 34, pp. 685-697, 2010. http://dx.doi.org/10.1111/j.1551-6709.2010.01100.x.
Gow Jr., D. W. et al., "How word onsets drive lexical access and segmentation: Evidence from acoustics, phonology and processing," in Proc. 4th Int. Conf. Spoken Language, 1996, http://dx.doi.org/10.1109/ICSLP.1996.607031.
Janse, E. "Word perception in fast speech: artificially time-compressed vs. naturally produced fast speech," Speech Communication, vol. 42, pp. 155-173, 2004, http://dx.doi.org/10.1016/j.specom.2003.07.001.
Liang, Y. J. et al. "Adaptive Playout Scheduling and Loss Concealment for Voice Communication Over IP Networks," IEEE Trans. Multimedia, vol. 5, No. 4, pp. 532-543, Dec. 2003, http://dx.doi.org/10.1109/TMM.2003.819095.
Luce, P. A. et al., "Recognizing Spoken Words: The Neighborhood Activation Model," Ear & Hearing, vol. 19, No. 1, pp. 1-36, Feb. 1998 http://journals.lww.com/ear-hearing/Abstract/1998/02000/Recognizing_Spoken_Words_The_Neighborhood.1.aspx.
P. Schwarz, "Phoneme Recognition Based on Long Temporal Context," Doctoral Thesis, Brno, Brno University of Technology, Faculty of Information Technology, Department of Computer Graphis and Multimedia, 2008.
Steyvers, M. et al., "The Large-Scale Structure of Semantic Networks: Statistical Analyses and a Model of Semantic Growth," Cognitive Science, vol. 29, No. 1, pp. 41-78, Jan.-Feb. 2005. http://dx.doi.org/10.1207/s15516709cog2901_3.
Storkel, H. L. et al., "Differentiating Phonotactic Probability and Neighborhood Density in Adult Word Learning," J. Speech, Language, and Hearing Research, vol. 49, pp. 1175-1192, Dec. 2006. http://dx.doi.org/10.1044/1092-4388(2006/085).
Van Den Zegel,T. "Phoneme Recognition with LS-SVMS: Towards an Automatic Speech Recognition System," Master Thesis submitted for the degree of Master of Artificial Intelligence, 2008-2009, Katholieke Universiteit Leuven.
Vitevitch, M. S. "The influence of phonological similarity neighborhoods on speech production," J. Experimental Psychology: Learning, Memory, and Cognition, vol. 28, No. 4, pp. 735-747, Jul. 2002. http://dx.doi.org/10.1037/0278-7393.28.4.735.
Vitevitch, M. S. "The Spread of the Phonological Neighborhood Influences Spoken Word Recognition," Mem Cognit. Author Manuscript, available in PMC Sep. 26, 2008, published in final edited form as: Mem. Cognit. Jan. 2007; 35(1): 166-175.
Vitevitch, M. S. "What Can Graph Theory Tell Us About Word Learning and Lexical Retrieval?," J. Speech, Language, and Hearing Research, vol. 51, pp. 408-422, Apr. 2008. http://dx.doi.org/10.1044/1092-4388(2008/030).

* cited by examiner

SMOOTHENING THE INFORMATION DENSITY OF SPOKEN WORDS IN AN AUDIO SIGNAL

FIELD OF THE INVENTION

The present disclosure relates generally to the field of audio signal modification and more particularly to increasing the temporal duration of high-information-density portions of spoken words in audio signals and decreasing the temporal duration of low-information-density portions of spoken words in audio signals.

BACKGROUND

To comprehend speech is to obtain meaning from spoken words. Intelligibility is a quality which enables spoken words to be understood. In a typical language, any given word will have a number of "sound-alike" words. The existence of these sound-alike words can make it difficult for the listener to identify words easily, quickly, and accurately from natural or synthesized speech. A word with low intelligibility can make identification even more difficult.

Many factors can influence intelligibility, such as the abilities or qualities of the human speaker or artificial speech synthesizer, the abilities or qualities of the human listener or electronic speech recognition device, and the presence of background noise. When the speech is electronically transmitted to a listener, even more factors can influence intelligibility, such as the quality of the transmission equipment, receiving equipment, and playback equipment.

SUMMARY

Disclosed herein are embodiments of a method and computer program product for facilitating modification of an audio signal. A word portion of the audio signal corresponding to a spoken word is identified. A plurality of phonemes are identified in the word portion. A first phoneme in the word portion occupies a temporal position in the word portion and has a temporal duration in the audio signal.

A set of alternates is generated corresponding to a set of alternate spoken words satisfying phonetic similarity criteria when compared to the spoken word. A subset of this set of alternates is identified having the first phoneme occupying the same temporal position as in the spoken word. A significance factor is then calculated based on the total number of alternates in the set and the number of alternates in the subset. The significance factor may then be used to modify the temporal duration, such as to lengthen or shorten the temporal duration in the audio signal.

Also disclosed herein are embodiments of a system for facilitating modification of an audio signal. A phoneme segmentation and recognition engine may identify the word portion and phonemes in the word portion. A phoneme significance engine in communication with the phoneme segmentation and recognition engine may generate the set of alternates and identify the subset of alternates. The phoneme significance engine may then calculate the significance factor.

DETAILED DESCRIPTION

In this detailed description, reference is made to the accompanying drawings, which illustrate example embodiments. It is to be understood that other embodiments may be utilized and structural changes may be made without departing from the scope of this disclosure. The terminology used herein is for the purpose of describing particular embodiments only and is not intended to be limiting.

Phonology is a branch of linguistics concerned with the systematic organization of sounds in languages. A phoneme is a basic unit of a language's phonology. Phonemes are combined to form meaningful units, such as words. A phoneme can be described as the smallest contrastive linguistic unit which may bring about a change of meaning in a word. For example, the difference in meaning between the English words "mill" and "miss" is a result of the exchange of the phoneme associated with the "ll" sound for the phoneme associated with the "ss" sound.

Figure 1:
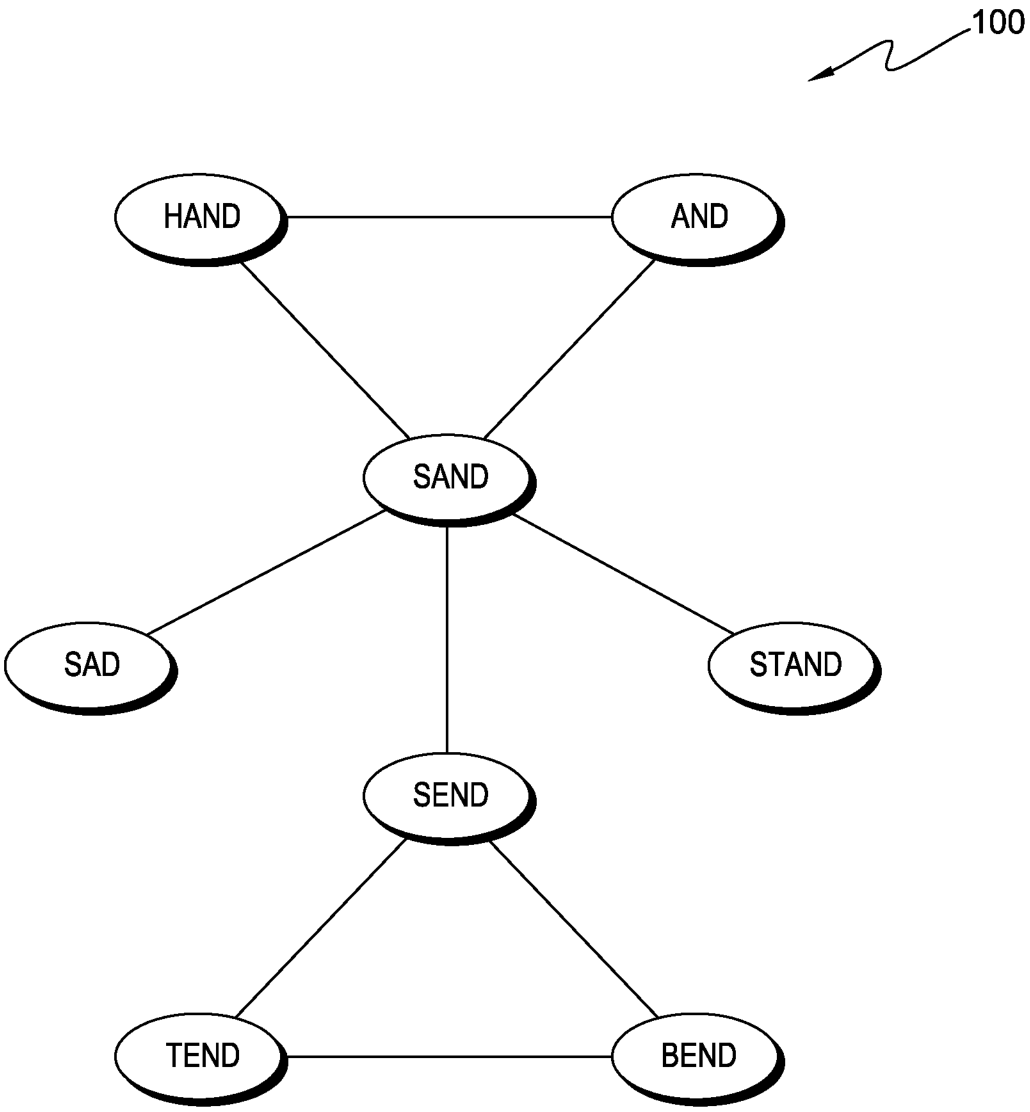
FIG. 1 represents a portion of an example phonological network for the English language.

FIG. 1 illustrates a portion 100 of an example phonological network for the English language. In a phonological network, words in a language are represented as nodes which are directly connected if the words differ by only a single phoneme. Because connected words have a similar sound, they can be difficult to distinguish from one another. In phonological network portion 100, the English word "sand" has a first-degree phonological connection to the English words "hand", "and", "sad", "stand", and "send". In addition, the word "sand" has a second-degree phonological connection to the words "tend" and "bend". Psycholinguistic studies suggest that several characteristics of the phonological network may influence cognitive processing, such as word recognition and retrieval. In particular, studies suggest that phonological network degree influences word recognition, word production, and word learning. Furthermore, studies suggest that phonological network clustering coefficients may influence speech production and recognition.

For a particular word in a particular language, a phoneme at a particular temporal position may be more useful than others in differentiating the word from its sound-alike words. In the example shown in Table 1, three sound-alike French language words have identical phonemes except for the phoneme in approximately the third temporal position. Consequently, this temporal position may be considered to be more significant, or "information dense", when attempting to distinguish between the three words.

TABLE 1

| Word | IPA phonetic transcription | Meaning |
| --- | --- | --- |
| bête noire | /bɛtnwaʁ/ | black beast, pet peeve |
| baie noire | /bɛnwaʁ/ | black bay |
| baignoire | /bɛɲwaʁ/ | bathtub |

As shown in Table 1, information density may not be uniform across a spoken word. Smoothening the information density can be accomplished by lengthening the duration of information-dense phonemes while shortening the duration of information-sparse phonemes. Such smoothening may improve intelligibility of speech and may therefore provide an advantage when attempting to distinguish a word from its sound-alike words, while avoiding unnecessary playback delays that result from lengthening the duration of an entire audio signal. Improved intelligibility may be particularly useful, for example, in e-learning courses. Depending on the ratio of information-dense phonemes to information-sparse phonemes, a smoothened audio signal may be shorter than the original audio signal, thus providing numerous benefits in addition to improving word distinction. Such benefits may include shortening the time required to listen to or otherwise process the audio signal, as well as reducing the rate requirements for storing, transmitting, and processing the audio signal. Further benefits may include improving the accuracy of automatic speech recognition technologies, since providing each word with individual non-uniform time scaling based on sound-alike words, rather than scaling phonemes independently, may improve reliability in the pattern recognition process.

Figure 2:
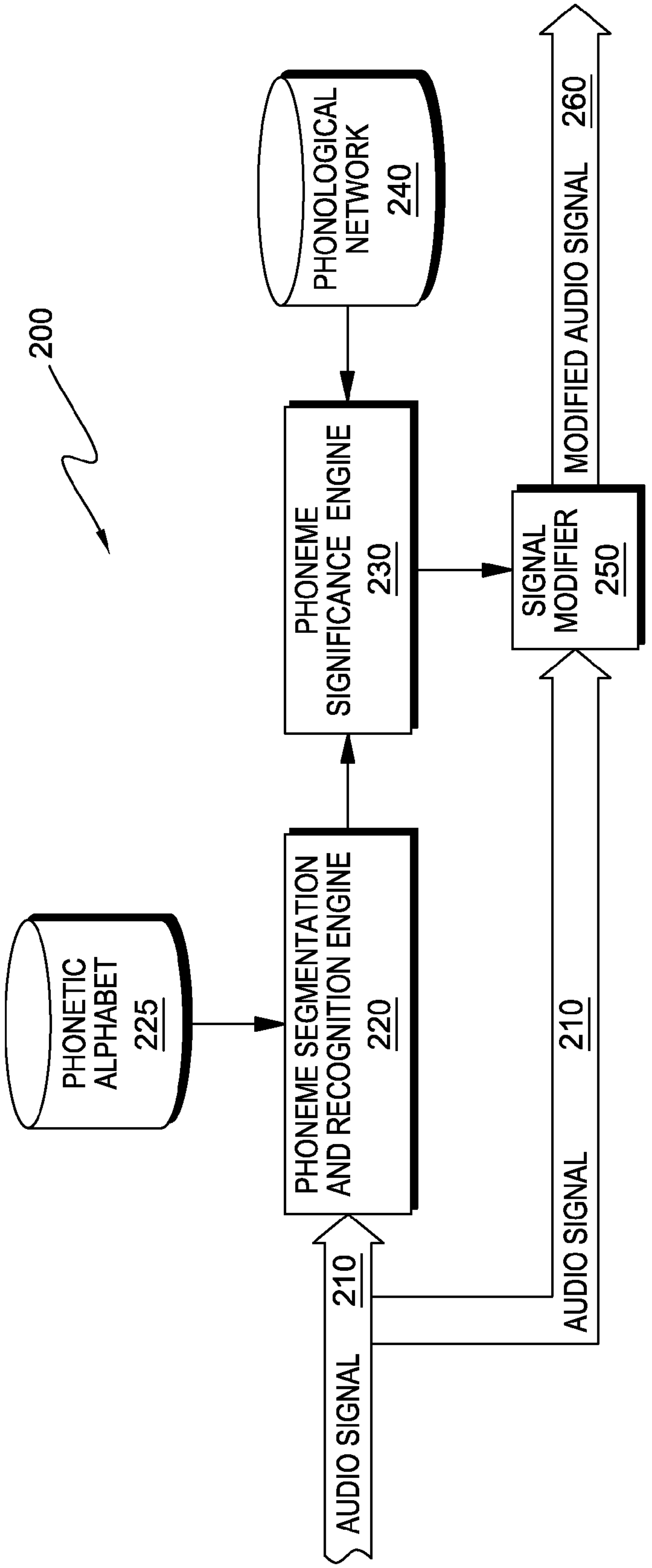
FIG. 2 is a block diagram of an example system for smoothening the information density of spoken words in an audio signal.

FIG. 2 illustrates a block diagram of an example system 200 for smoothening the information density of spoken words in an audio signal. A phoneme segmentation and recognition engine 220 receives audio signal 210. The audio signal may be in any form recognizable to phoneme segmentation and recognition engine 220. In some embodiments, the audio signal may be an analog speech waveform. In other embodiments, the audio signal may be a digital or other type of signal. A speech recognition algorithm in the phoneme segmentation and recognition engine 220 may produce a phoneme sequence from the audio signal using phonetic alphabet 225. A phoneme significance engine 230 may then examine the phoneme sequence and generate sets of alternate words for individual words in the phoneme sequence. The set of alternate words generated for a specific word is the set of sound-alikes for that word. The set of alternate words may be selected from a phonological network 240.

Words in phonological network 240 may be selected as alternates for a specific word if they satisfy phonetic similarity criteria when compared to the specific word. For example, the set of alternates may correspond to all words in phonological network 240 with a first-degree phonological connection to the specific word. For another example, the set of alternates may correspond to all words in phonological network 240 with a second-degree phonological connection to the specific word. In some embodiments, the set of alternates may satisfy phonetic similarity criteria not involving the use of a phonological network. If a word has no sound-alikes, phoneme significance engine 230 proceeds to the next word in the phoneme sequence.

After generating a set of alternate sound-alike words for a portion of the audio signal corresponding to a specific word, phoneme significance engine 230 may then calculate significance factors for the phonemes in the specific word. A significance factor may be calculated for each phoneme in the specific word. A phoneme's significance factor is a representation of the phoneme's information density. For example, a higher significance factor may indicate that the phoneme is more important (information-dense) in distinguishing the specific word from its sound-alike words, while a lower significance factor may indicate that the phoneme is less important (information-sparse) in distinguishing the specific word from its sound-alike words.

The calculated significance factors may then be provided to a signal modifier 250 along with audio signal 210. Signal modifier 250 may then use the significance factors to determine appropriate temporal modifications to the audio signal to produce modified audio signal 260. For example, information-dense phonemes may be slowed down in the modified audio signal, while information-sparse phonemes may be speeded up. Various time-scale modification algorithms (e.g., resampling, or using a phase vocoder) may be configured to accept the calculated significance factors for use by signal modifier 250 to perform the audio signal modifications. For example, existing algorithms for uniformly increasing or decreasing the speed of audio playback based on user input may be modified to operate with variable input from phoneme significance engine 230.

Figure 3:
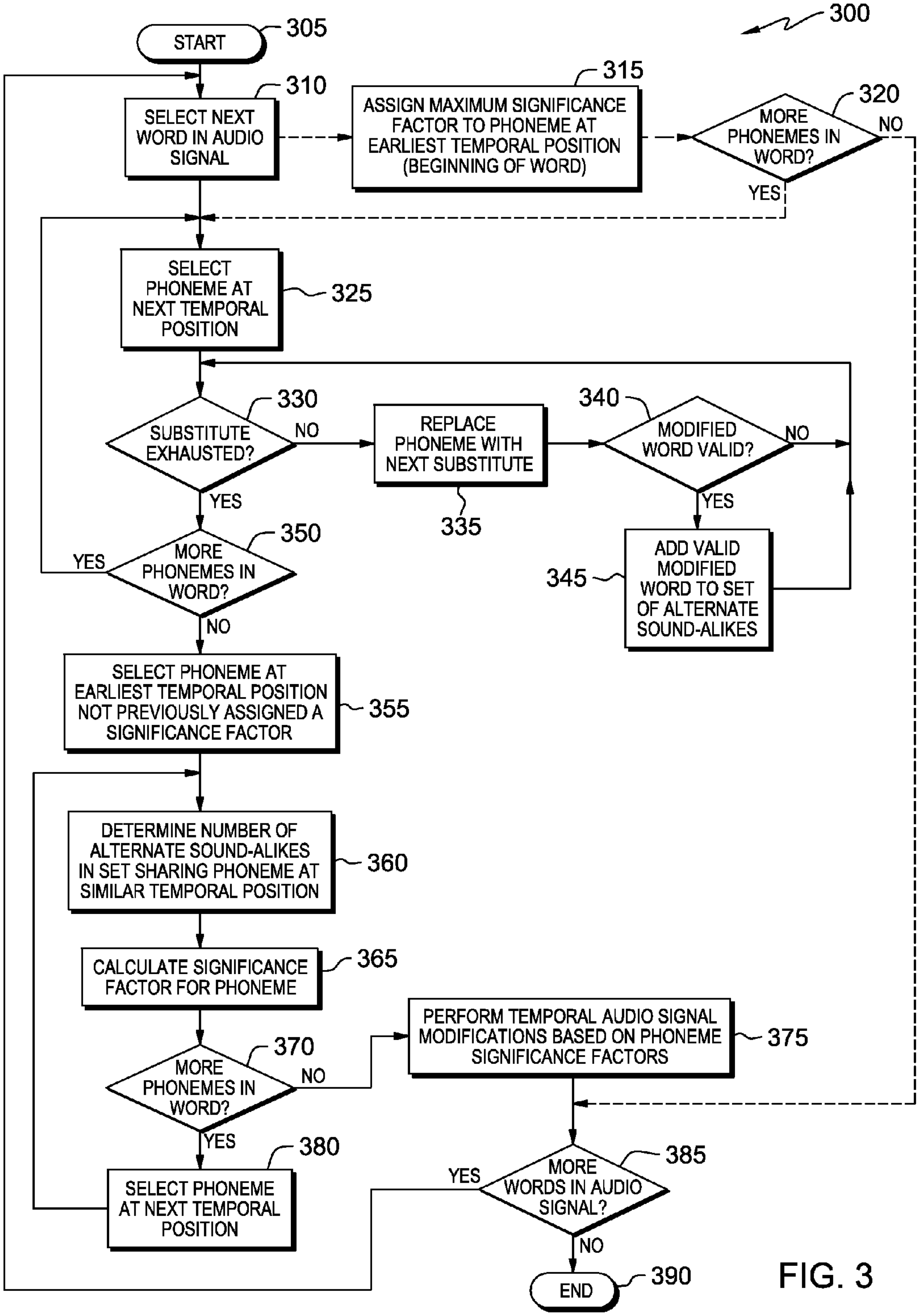
FIG. 3 is a flow diagram for an example method for smoothening the information density of spoken words in an audio signal.

An example method 300 for smoothening the information density of spoken words in an audio signal is shown in FIG. 3. From start 305, a portion of an audio signal corresponding to a spoken word in a particular language is identified and selected at 310. This identification process may include, for example, producing a phoneme sequence from the audio signal using a supplied phonetic alphabet for the language. This identification process may also include, for example, using a speech recognition algorithm to identify the word. Embodiments for use with any spoken language are contemplated.

In some embodiments, the first phoneme in the identified word is then selected at 325. But in some embodiments, illustrated by the dashed lines in FIG. 3, the first phoneme in the word may instead be assigned a high (or maximum) significance factor at 315. First phonemes, which are located at the beginning (earliest temporal position) of words, have perceptual and temporal properties that may drive critical aspects of spoken word recognition, and may therefore be highly significant for intelligibility. Consequently, some embodiments may provide that the beginning phoneme in the identified word is assigned a high (or the highest possible) significance factor. In such embodiments, the phoneme following the beginning phoneme (unless there are none at 320) is the first phoneme selected at 325. For single-phoneme words that are assigned the maximum significance factor at 315, there are no additional phonemes at 320, and therefore the next word in the audio signal is selected at 310 (if another word exists in the audio signal at 385).

The phoneme selected at 325 may then be replaced with a substitute at 335. The substitute may be a different phoneme or phoneme combination. The resulting "potential word" is then evaluated. If the "potential word" is a valid word in the language of the embodiment at 340, then that valid word is added to a set of alternate words at 345. This set of alternate words is the set of sound-alike words for the selected word. In some embodiments, all possible phonemes in the language may be substituted at 335; in other embodiments, less than all phonemes in the language may be substituted. Furthermore, in some embodiments a null phoneme may be substituted to evaluate potential alternate words that are simply missing the selected phoneme rather than having a different phoneme. Factors influencing which phonemes are substituted may include the phonetic structure of the language, the incidence rate of the substitute in the language, the degree of similarity between the substitute and the selected phoneme, as well as other factors.

After all substitutes for the selected phoneme have been processed and evaluated at 330, the phoneme in the next temporal position in the identified word is selected at 325 (if another phoneme exists in the identified word at 350). The substitution process then repeats until all phonemes in the selected word have been processed, although embodiments are contemplated that may process less than all phonemes in the selected word. For example, an embodiment may process only the first five phonemes in a selected word, or an embodiment may skip processing a particularly unique phoneme that is unlikely to cause confusion.

When there are no further phonemes to process for the selected word at 350, the set of alternate sound-alike words is complete. Note that method 300 as depicted in FIG. 3 produces a set of alternates with a first-degree phonological connection to the identified word, with each word in the set of alternates differing from the identified word by only one phoneme. In some embodiments, the method may be modified to produce a set of alternates with a second-degree phonological connection or with some other relationship to the identified word. A process designer may select any algorithm appropriate for generating a set of alternates that corresponds to a set of desired sound-alikes. Sample sets of sound-alike words for the English language are shown in Tables 2, 3, and 4. Each sample set may represent the set of alternates for any individual word in the set.

TABLE 2

| | | | | | | |
|---|---|---|---|---|---|---|
| convictions | contentions | collections | connections | concessions | confections | correction |
| convection | conceptions | convention | concession | confection | contention | collection |
| conventions | confectioner | confessions | corrections | conception | confession | confectioners |
| connection | conviction | | | | | |

TABLE 3

| | | | | | | |
|---|---|---|---|---|---|---|
| billionths | pinion | million | millionth | pillions | millions | millionaires |
| pinioned | millionaire | bullion | pinions | minion | pillion | billions |
| opinion | minions | millionths | billiards | bilious | billionth | billiard |
| billion | opinions | | | | | |

TABLE 4

| | | | | | | |
|---|---|---|---|---|---|---|
| rudeness | shrewdness | feminist | wordiness | fussiness | readiness | dowdiness |
| crustiness | wheeziness | mustiness | feminists | fustiness | seediness | mistiness |
| reediness | lustiness | seaminess | airworthiness | muzziness | rustiness | mugginess |
| roominess | rowdiness | reminiscent | moodiness | reminiscence | seemliness | reminisced |
| greasiness | redness | fuzziness | neediness | muskiness | phoniness | worthiness |
| greediness | ruddiness | speediness | queasiness | duskiness | muddiness | funniness |
| weediness | huskiness | reminisce | sunniness | easiness | | |

After generating the set of alternates, the method transitions to calculating significance factors for the phonemes. The same phoneme will likely have different information densities in different words. For example, the English word “cooking” is not likely to be misidentified as “cookine” or “cookeen” because “cookine” and “cookeen” are not valid English words. But the English word “sailing” could be misidentified as “saline” since “saline” is a valid English word. Therefore, the “-ing” phoneme combination should have less significance for the word “cooking” than it does for the word “sailing”.

At 355, the phoneme at the earliest temporal position in the identified word that has not been previously assigned a significance factor is selected. This selected phoneme may be the phoneme at the beginning of the word. In some embodiments, this selected phoneme may be a different phoneme, such as the phoneme immediately following the beginning phoneme. The significance of the selected phoneme in the selected word may be based on the number of alternates in a subset of the set identified at 345, where each alternate in the subset has the identical phoneme at a similar temporal position. A larger subset may indicate that the phoneme is less significant, since there may be less opportunity to confuse the word with another valid word on the basis of the selected phoneme.

This subset of alternates is identified in method 300 at 360. Each alternate word in the subset shares the selected phoneme at a similar temporal position as the selected word. For example, if the selected word identified in the audio signal is “sand”, if the selected phoneme is the third temporal phoneme, and if the words “hand”, “and”, “sad”, “send”, and “stand” are in the set of alternates, then the subset may include all alternates except for “sad”. A significance factor may then be calculated for the selected phoneme based on the number of alternates in the subset.

If the selected phoneme at the temporal position of the selected word appears at a similar temporal position in every sound-alike word, then the number of words in the set of alternates will be equal to the number of words in the subset, and the selected phoneme may be assigned a minimum (or low) significance factor. Such phonemes may be of low importance (information-sparse) for intelligibility, because there is little chance for misidentifying the word based on the selected phoneme.

But if the selected phoneme at the temporal position of the selected word appears at a similar temporal position in less than every sound-alike word, then a mathematical formula may be applied to calculate the significance factor for the phoneme. For example, the formula $$\text{significance factor}=1-(\text{cnt}/(\text{cnt}+\text{cnttot}))*\text{constant}$$

may be used, where cnttot is the number of sound-alikes in the set of alternates, where cnt is the number of sound-alikes in the subset of alternates, and where constant is a weighting factor. A developer may then select a value for constant that is customized to the particular environment where the method is used. In an embodiment using this mathematical formula with constant equal to 0.6, the maximum significance factor may be defined as 1.0, the minimum significance factor may be defined as 0.7, and calculated significance factors may range between 0.7 and 1.0. For example, if a selected word has 24 sound-alike words in its set of alternates, and if a selected first phoneme of the selected word appears at a similar temporal position in 10 of the 24 alternates, then the first phoneme may have a significance factor of 1−(10/(10+24))*0.6=0.824. If a selected second phoneme of the selected word appears at a similar temporal location in 2 of the 24 alternates, then the second phoneme may have a significance factor of 1−(2/(2+24))*0.6=0.954. The second phoneme has a higher significance factor than the first phoneme, because there are more opportunities for misidentification associated with the second phoneme.

In some embodiments, other algorithms may be employed to determine the significance factor or other measure of information density of phonemes in a particular word. For example, an algorithm may use the Shannon entropy of the phoneme with respect to sound-alikes. For another example, an algorithm may determine the Bayesian surprise of the word in its phonological context.

After the significance factor is calculated for the selected phoneme at 365, the method repeats at 380 until all phonemes in the selected word have been processed at 370. The audio signal is then modified at 375 based on the significance factors of the phonemes. Phonemes with higher significance factors may be lengthened, phonemes with lower significance factors may be shortened, and some phonemes may be unchanged. The entire method is then repeated for the next word in the audio signal at 310. After all words in the audio signal have been processed at 385, the method ends at 390.

Figure 4:
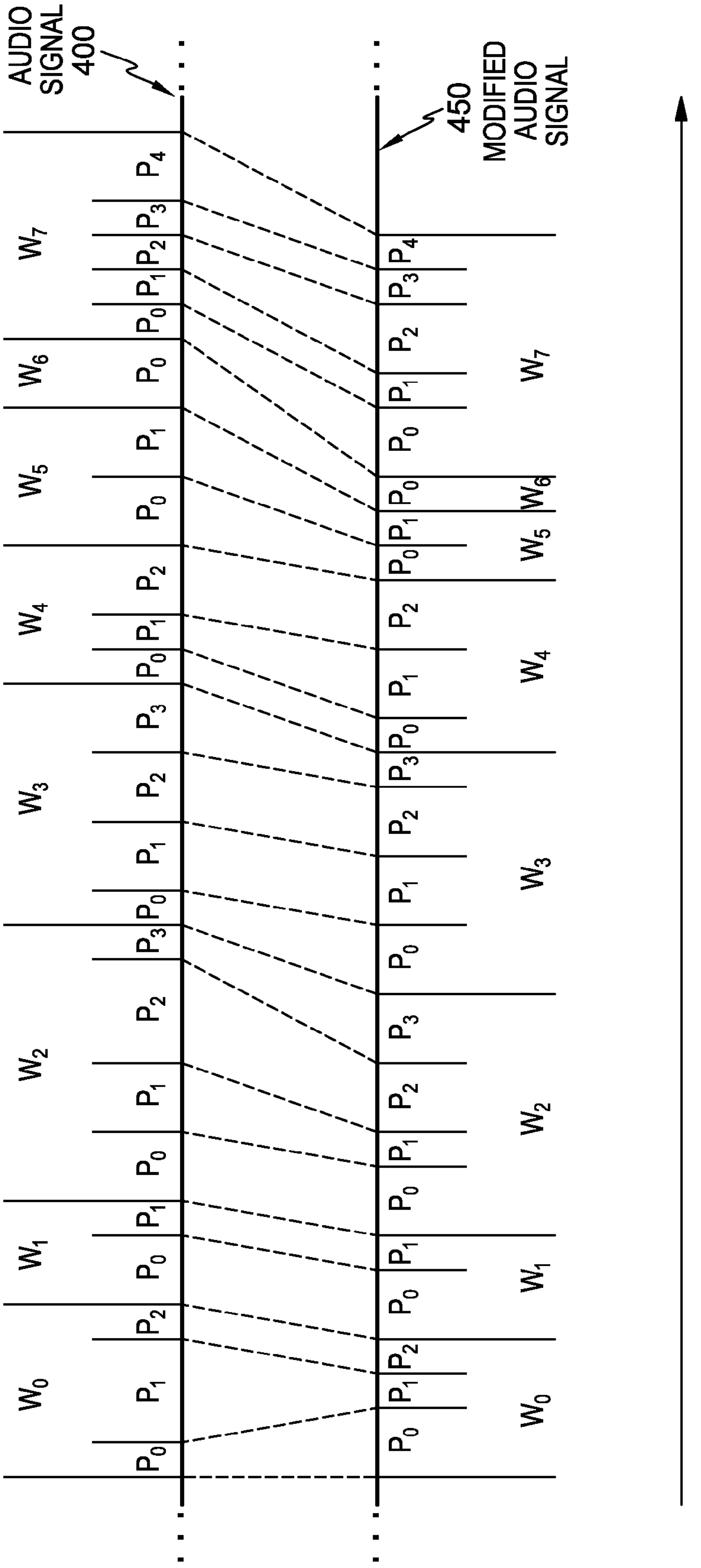
FIG. 4 is a representation of an example audio signal before and after smoothening the information density of spoken words identified in the audio signal.

FIG. 4 illustrates an example portion of an audio signal before and after smoothening the information density of spoken words identified in the audio signal. Audio signal modifications represented in FIG. 4 are not to scale, and may have been exaggerated for clarity. Eight words are identified in audio signal 400: $W_0$ through $W_7$. A number of phonemes $P_n$ are identified for each word $W_n$. In modified audio signal 450, for word $W_0$, phoneme $P_0$ has been lengthened based on its calculated significance factor, phoneme $P_1$ has been shortened based on its calculated significance factor, and phoneme $P_2$ has stayed approximately constant based on its calculated significance factor, resulting in an overall shortening of the temporal length of word $W_0$. Similarly, each identified word of audio signal 400 has been processed, resulting in modified audio signal 450. Information-dense phonemes have been lengthened, and information-sparse phonemes have been shortened.

Figure 5:
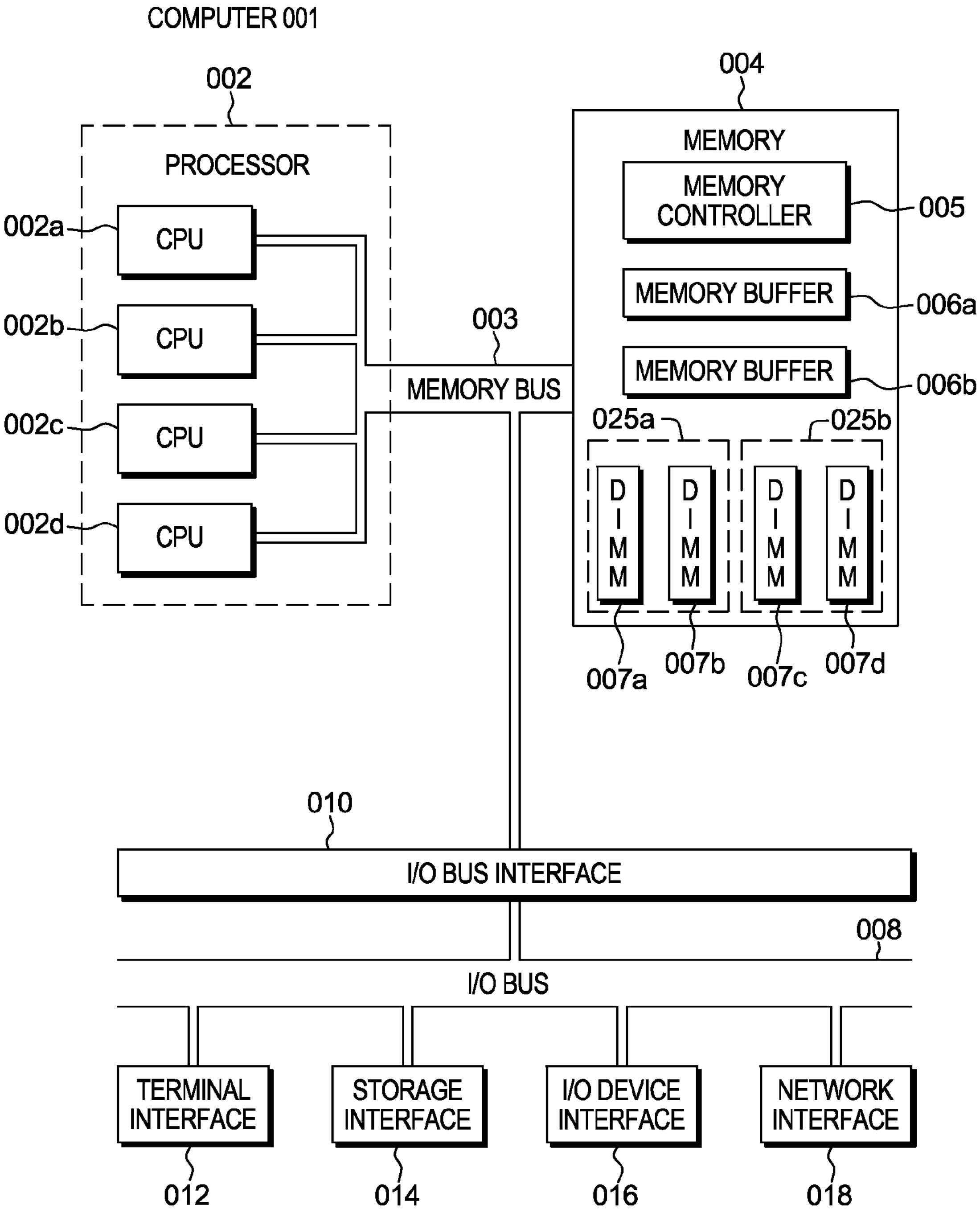
FIG. 5 is a block diagram of an example computer system for smoothening the information density of spoken words in an audio signal.

FIG. 5 depicts a high-level block diagram of an example system for implementing disclosed embodiments. The mechanisms and apparatus of embodiments apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips 015*a*-015*n* (collectively referred to as 015) mounted on a printed circuit board and designed for use in personal computers, workstations, and servers. The use of DRAMs 015 in the illustration is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 5 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an example computer system 001. But individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM 0015 may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a “circuit,” “module,” or “system.” Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments are not intended to limit the present invention. Indeed, other alternative hardware and/or program environments may be used without departing from the scope of embodiments of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for modifying an audio signal, the method comprising:

receiving an audio signal, the received audio signal having an original temporal duration;

identifying a word portion of the audio signal, the word portion corresponding to a spoken word;

identifying a plurality of phonemes in the word portion, a first phoneme of the plurality of phonemes occupying a temporal position in the word portion, the first phoneme having a first temporal duration in the audio signal;

generating a set of alternates, each alternate in the set corresponding to an alternate spoken word satisfying phonetic similarity criteria when compared to the spoken word, the set containing a total number of alternates;

identifying a subset of alternates from the set of alternates, the first phoneme occupying the temporal position in each alternate in the subset, the subset containing a subset number of alternates;

calculating a first significance factor for the first phoneme, the first significance factor based on a proportion of the subset number of alternates to the total number of alternates;

modifying the first temporal duration of the first phoneme based on the first significance factor; and outputting the audio signal, the output audio signal including the word portion, the word portion including the first phoneme with the modified first temporal duration, the output audio signal having a modified temporal duration different from the original temporal duration.

2. The method of claim 1, wherein the spoken word is artificially synthesized.

3. The method of claim 1, wherein the modifying the first temporal duration is selected from the group consisting of lengthening the first temporal duration and shortening the first temporal duration.

4. The method of claim 1, wherein the generating the set of alternates comprises:

selecting each alternate in the set of alternates from a phonological network.

5. The method of claim 4, wherein a first number of phonemes are identified in the word portion, and wherein the satisfying the phonetic similarity criteria comprises:

sharing one less than the first number of phonemes, each shared phoneme satisfying temporal position criteria.

6. The method of claim 4, wherein a first number of phonemes are identified in the word portion, and wherein the satisfying the phonetic similarity criteria comprises:

sharing at least two less than the first number of phonemes, each shared phoneme satisfying temporal position criteria.

7. The method of claim 1, wherein a second phoneme occupies an earliest temporal position in the word portion and wherein the second phoneme has a second temporal duration, the method further comprising:

modifying the second temporal duration based on a maximum significance factor.

8. The method of claim 1, wherein the subset number is equal to the total number, and wherein the calculating the first significance factor comprises:

setting the first significance factor equal to a minimum significance factor.

9. The method of claim 1, wherein the calculating the first significance factor comprises:

applying a mathematical formula to the subset number and the total number to produce the first significance factor.

10. The method of claim 9, wherein the mathematical formula is 1.0−(the subset number/(the subset number+the total number))*a constant.

11. The method of claim 10, where the constant is equal to 0.6.

12. The method of claim 1, wherein the spoken word is an English language word.

13. A computer system comprising:

a memory; and a processor in communication with the memory, wherein the computer system is configured to perform a method comprising:

receiving an audio signal, the received audio signal having an original temporal duration;

identifying a word portion of the audio signal, the word portion corresponding to a spoken word;

identifying a plurality of phonemes in the word portion, a first phoneme of the plurality of phonemes occupying a temporal position in the word portion, the first phoneme having a first temporal duration in the audio signal;

generating a set of alternates, each alternate in the set corresponding to an alternate spoken word satisfying phonetic similarity criteria when compared to the spoken word, the set containing a total number of alternates;

identifying a subset of alternates from the set of alternates, the first phoneme occupying the temporal position in each alternate in the subset, the subset containing a subset number of alternates;

calculating a first significance factor for the first phoneme, the first significance factor based on a proportion of the subset number of alternates to the total number of alternates;

modifying the first temporal duration of the first phoneme based on the first significance factor; and outputting the audio signal, the output audio signal including the word portion, the word portion including the first phoneme with the modified first temporal duration, the output audio signal having a modified temporal duration different from the original temporal duration.

14. The computer system of claim 13, wherein the modifying the first temporal duration is selected from the group consisting of lengthening the first temporal duration and shortening the first temporal duration.

15. The computer system of claim 13, wherein the generating the set of alternates comprises:

selecting each alternate in the set of alternates from a phonological network.

16. The computer system of claim 15, wherein a first number of phonemes are identified in the word portion, and wherein the satisfying the phonetic similarity criteria comprises:

sharing one less than the first number of phonemes, each shared phoneme satisfying temporal position criteria.

17. The computer system of claim 15, wherein a first number of phonemes are identified in the word portion, and wherein the satisfying the phonetic similarity criteria comprises:

sharing at least two less than the first number of phonemes, each shared phoneme satisfying temporal position criteria.

18. The computer system of claim 13, wherein the calculating the first significance factor comprises:

applying a mathematical formula to the subset number and the total number to produce the first significance factor.

19. A computer program product comprising a non-transitory computer readable storage medium having program code embodied therewith, the program code executable by a computer system to perform a method for modifying an audio signal, the method comprising:

receiving an audio signal, the received audio signal having an original temporal duration;

identifying a word portion of the audio signal, the word portion corresponding to a spoken word;

identifying a plurality of phonemes in the word portion, a first phoneme of the plurality of phonemes occupying a temporal position in the word portion, the first phoneme having a first temporal duration in the audio signal;

generating a set of alternates, each alternate in the set corresponding to an alternate spoken word satisfying phonetic similarity criteria when compared to the spoken word, the set containing a total number of alternates;

identifying a subset of alternates from the set of alternates, the first phoneme occupying the temporal position in each alternate in the subset, the subset containing a subset number of alternates;

calculating a first significance factor for the first phoneme, the first significance factor based on a proportion of the subset number of alternates to the total number of alternates;

modifying the first temporal duration of the first phoneme based on the first significance factor; and outputting the audio signal, the output audio signal including the word portion, the word portion including the first phoneme with the modified first temporal duration, the output audio signal having a modified temporal duration different from the original temporal duration.

20. The computer program product of claim 19, wherein the calculating the first significance factor comprises:

applying a mathematical formula to the subset number and the total number to produce the first significance factor.

* * * * *